(12) United States Patent
Li

(10) Patent No.: US 8,602,442 B2
(45) Date of Patent: Dec. 10, 2013

(54) COLLAPSIBLE STROLLER

(75) Inventor: Jian Qun Li, Central Hong Kong (HK)

(73) Assignee: Wonderland Nurserygoods Company Limited, Hong Kong (HK)

(*) Notice: Subject to any disclaimer, the term of this patent is extended or adjusted under 35 U.S.C. 154(b) by 190 days.

(21) Appl. No.: 13/191,839

(22) Filed: Jul. 27, 2011

(65) Prior Publication Data

US 2012/0032419 A1 Feb. 9, 2012

(30) Foreign Application Priority Data

Aug. 3, 2010 (CN) .................. 2010 2 0291304 U

(51) Int. Cl.
*B62B 7/08* (2006.01)
(52) U.S. Cl.
CPC .................................... *B62B 7/08* (2013.01)
USPC ........................... 280/647; 280/642; 280/650
(58) Field of Classification Search
CPC ........................................................ B62B 7/08
USPC .................. 280/638, 639, 642, 647, 648, 650
See application file for complete search history.

(56) References Cited

U.S. PATENT DOCUMENTS

| | | | | |
|---|---|---|---|---|
| 4,822,064 A * | 4/1989 | Hunter | ............................ | 280/30 |
| 5,513,864 A * | 5/1996 | Huang | ........................ | 280/47.36 |
| 5,622,377 A * | 4/1997 | Shamie | ........................ | 280/642 |
| 5,718,444 A * | 2/1998 | Huang | ........................... | 280/650 |
| 6,478,327 B1 * | 11/2002 | Hartenstine et al. | .......... | 280/642 |
| 6,581,957 B1 * | 6/2003 | Lan | ................................ | 280/642 |
| 6,626,451 B1 | 9/2003 | Song | | |
| 6,626,452 B2 * | 9/2003 | Yang et al. | ..................... | 280/643 |
| 6,666,473 B2 * | 12/2003 | Hartenstine et al. | .......... | 280/647 |
| 6,951,342 B2 * | 10/2005 | Lan | ................................ | 280/47.4 |
| 7,185,909 B2 * | 3/2007 | Espenshade et al. | ......... | 280/642 |
| 7,188,858 B2 * | 3/2007 | Hartenstine et al. | .......... | 280/642 |
| 7,374,196 B2 * | 5/2008 | Hartenstine et al. | .......... | 280/642 |
| 7,410,185 B2 * | 8/2008 | Chen et al. | ..................... | 280/642 |
| 7,614,640 B2 * | 11/2009 | Dean et al. | ..................... | 280/642 |
| 7,614,641 B2 * | 11/2009 | Hartenstine et al. | .......... | 280/642 |
| 7,686,322 B2 * | 3/2010 | Longenecker et al. | ....... | 280/642 |
| 7,717,456 B2 * | 5/2010 | Chen et al. | ..................... | 280/642 |

(Continued)

FOREIGN PATENT DOCUMENTS

| | | |
|---|---|---|
| CN | 201395155 Y | 2/2010 |
| CN | 201604683 U | 10/2010 |
| CN | 201633763 U | 11/2010 |
| WO | 2008142082 A1 | 11/2008 |

*Primary Examiner* — Hau Phan
*Assistant Examiner* — Jacob Meyer
(74) *Attorney, Agent, or Firm* — David I. Roche; Baker & McKenzie LLP

(57) ABSTRACT

A collapsible stroller comprises a support frame and a linkage assembly. The support frame includes handle arms, front and rear leg tubes, a seat board, and linking segments mounted at two sides of the seat board. The handle arms are pivotally connected with rear ends of the linking segments via first hinge structures, the front and rear leg tubes are pivotally connected with the front ends of the linking segments via second hinge structures. Wheels are also mounted at lower ends of the front and rear leg tubes. The linkage assembly includes support brackets and linkage tubes. The support brackets are above the linking segments and connected between the handle arms. The linkage tubes have middle portions pivotally connected with middle portions of the linking segments, and each of the linkage tubes has a first end pivotally connected with one associated support bracket, and a second end detachably locked with one associated rear leg tube.

20 Claims, 13 Drawing Sheets

(56) References Cited

U.S. PATENT DOCUMENTS

| | | | |
|---|---|---|---|
| 7,717,457 B2* | 5/2010 | Bearup et al. | 280/647 |
| 7,766,368 B2* | 8/2010 | Tsai | 280/649 |
| 7,862,069 B2* | 1/2011 | King | 280/650 |
| 7,871,100 B2* | 1/2011 | Chen et al. | 280/642 |
| 7,971,897 B2* | 7/2011 | Pike et al. | 280/650 |
| 8,070,179 B2* | 12/2011 | Pike et al. | 280/642 |
| 8,141,895 B2* | 3/2012 | Haut et al. | 280/642 |
| 8,205,907 B2* | 6/2012 | Chicca | 280/642 |
| 8,262,124 B2* | 9/2012 | Longenecker et al. | 280/650 |
| 8,322,744 B2* | 12/2012 | Ahnert et al. | 280/642 |
| 8,366,139 B2* | 2/2013 | Kane | 280/647 |
| 2003/0201625 A1* | 10/2003 | Espenshade et al. | 280/642 |
| 2003/0201626 A1* | 10/2003 | Hartenstine et al. | 280/642 |
| 2005/0046152 A1* | 3/2005 | Hutchinson | 280/642 |
| 2005/0067813 A1* | 3/2005 | Lin | 280/642 |
| 2005/0098982 A1* | 5/2005 | Huang | 280/642 |
| 2005/0242547 A1* | 11/2005 | Chen | 280/642 |
| 2005/0242549 A1* | 11/2005 | Longenecker et al. | 280/642 |
| 2006/0066077 A1* | 3/2006 | Espenshade et al. | 280/642 |
| 2006/0125210 A1* | 6/2006 | Fox et al. | 280/642 |
| 2006/0163847 A1* | 7/2006 | Hartenstine et al. | 280/642 |
| 2006/0175803 A1* | 8/2006 | Santoski | 280/642 |
| 2007/0096438 A1* | 5/2007 | Valdez et al. | 280/652 |
| 2007/0257472 A1* | 11/2007 | Hartenstine et al. | 280/642 |
| 2007/0262565 A1* | 11/2007 | Bearup et al. | 280/642 |
| 2008/0061533 A1* | 3/2008 | Li | 280/642 |
| 2008/0073877 A1* | 3/2008 | Pike et al. | 280/639 |
| 2008/0073879 A1* | 3/2008 | Chen et al. | 280/642 |
| 2008/0079240 A1* | 4/2008 | Yeh | 280/642 |
| 2008/0157491 A1* | 7/2008 | Chen et al. | 280/642 |
| 2008/0185821 A1* | 8/2008 | Chen et al. | 280/642 |
| 2008/0238042 A1* | 10/2008 | Chen et al. | 280/650 |
| 2008/0284136 A1* | 11/2008 | Tsai | 280/642 |
| 2009/0020984 A1* | 1/2009 | Chen et al. | 280/650 |
| 2009/0127828 A1* | 5/2009 | Longenecker et al. | 280/650 |
| 2009/0152836 A1* | 6/2009 | Pike et al. | 280/650 |
| 2009/0309336 A1* | 12/2009 | Hanson | 280/647 |
| 2010/0127480 A1* | 5/2010 | Ahnert et al. | 280/647 |
| 2010/0237589 A1* | 9/2010 | Haut et al. | 280/642 |
| 2010/0237590 A1* | 9/2010 | Kane | 280/649 |
| 2011/0012325 A1* | 1/2011 | Gower et al. | 280/648 |
| 2011/0181025 A1* | 7/2011 | Chen | 280/647 |
| 2011/0248477 A1* | 10/2011 | Chen et al. | 280/647 |
| 2011/0291388 A1* | 12/2011 | Sellers et al. | 280/647 |
| 2011/0304124 A1* | 12/2011 | Chen et al. | 280/647 |
| 2012/0056408 A1* | 3/2012 | Wu et al. | 280/642 |
| 2012/0104729 A1* | 5/2012 | Yi | 280/642 |
| 2012/0112435 A1* | 5/2012 | Kobayashi | 280/647 |
| 2012/0169030 A1* | 7/2012 | Bizzell et al. | 280/642 |
| 2012/0319382 A1* | 12/2012 | Lin | 280/647 |

\* cited by examiner

COLLAPSIBLE STROLLER

CROSS-REFERENCE TO RELATED APPLICATION

This application claims priority to China Utility Model Application No. 201020291304.5 filed on Aug. 3, 2010.

BACKGROUND OF THE INVENTION

1. Field of the Invention

The present invention relates to a child nursery apparatuses, especially to collapsible stroller apparatuses.

2. Description of the Related Art

Infant strollers generally have a foldable frame construction that allows the stroller to be collapsed into a compact form for convenient storage and portability, and deployed for use.

However, the current stroller construction usually defines only one pivotal axis that allows to collapse the stroller frame into a two-fold structure. This arrangement occupies a volume that may be still relatively large to the consumer, and cannot allow convenient storage and portability. Moreover, the current strollers often lack side support elements at the rear of the stroller frame, which makes it less stable raise safety issues, and also affects its service life.

Therefore, there is a need for an improved stroller that has a more stable construction and can be conveniently collapsed into a compact form to facilitate storage and portability.

SUMMARY

The present application describes a collapsible stroller suitable for placement of a young child. According to one embodiment, the collapsible stroller comprises a support frame and a linkage assembly. The support frame includes handle arms, front leg tubes, rear leg tubes, a seat board, and linking segments mounted at two sides of the seat board, wherein the handle arms are pivotally connected with rear ends of the linking segments via first hinge structures, the front leg tubes and the rear leg tubes are pivotally connected with the front ends of the linking segments via second hinge structures, lower ends of the rear leg tubes are mounted with front wheels, and lower ends of the rear leg tubes are mounted with rear wheels. The linkage assembly includes support brackets and linkage tubes, wherein the support brackets are above the linking segments and connected between the handle arms, the linkage tubes have middle portions pivotally connected with middle portions of the linking segments, and each of the linkage tubes has a first end pivotally connected with one associated support bracket, and a second end detachably locked with one associated rear leg tube.

DETAILED DESCRIPTION OF THE EMBODIMENTS

Figure 1:
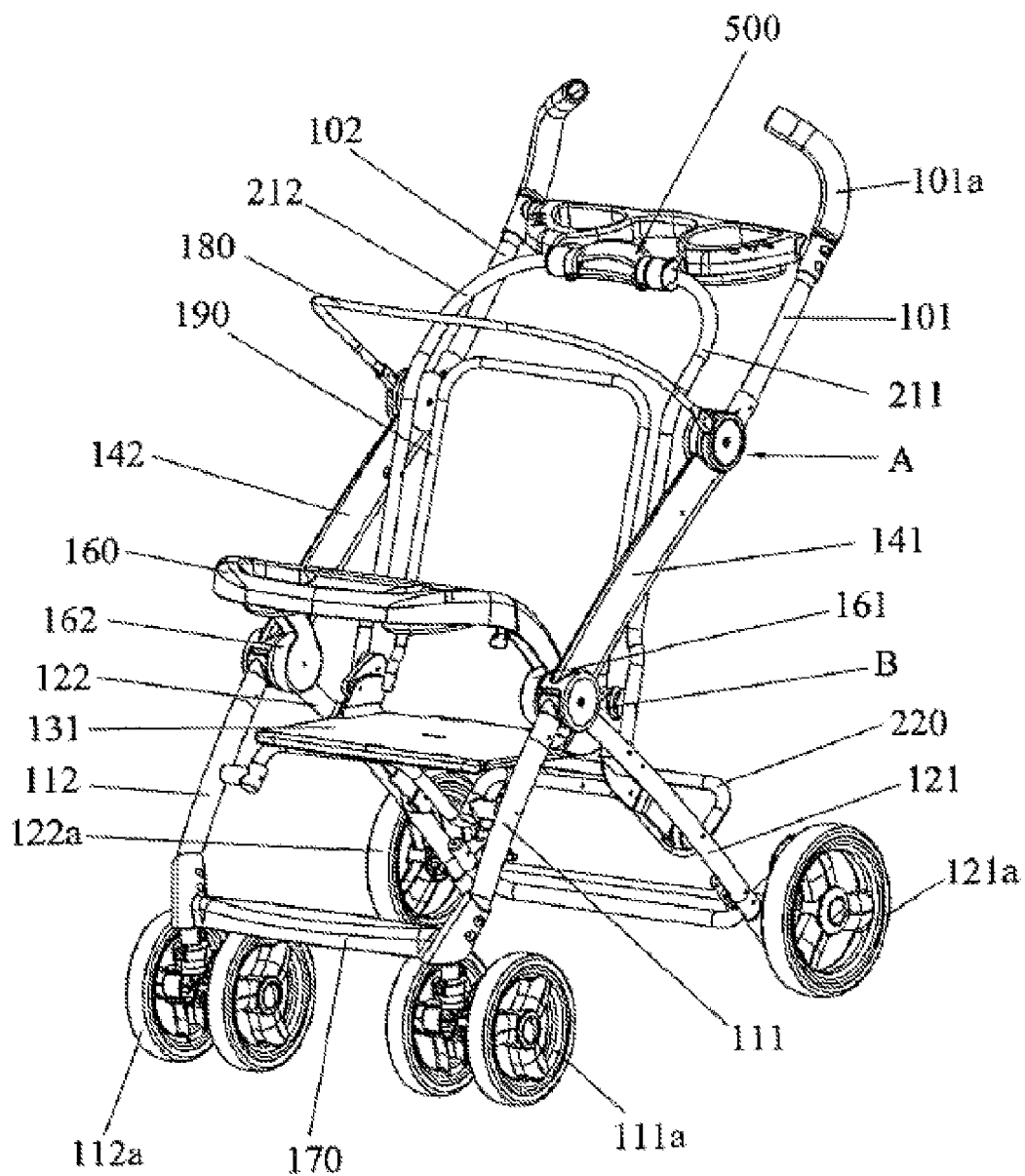
FIG. 1 is a perspective view illustrating one embodiment of a collapsible stroller.
Figure 2:
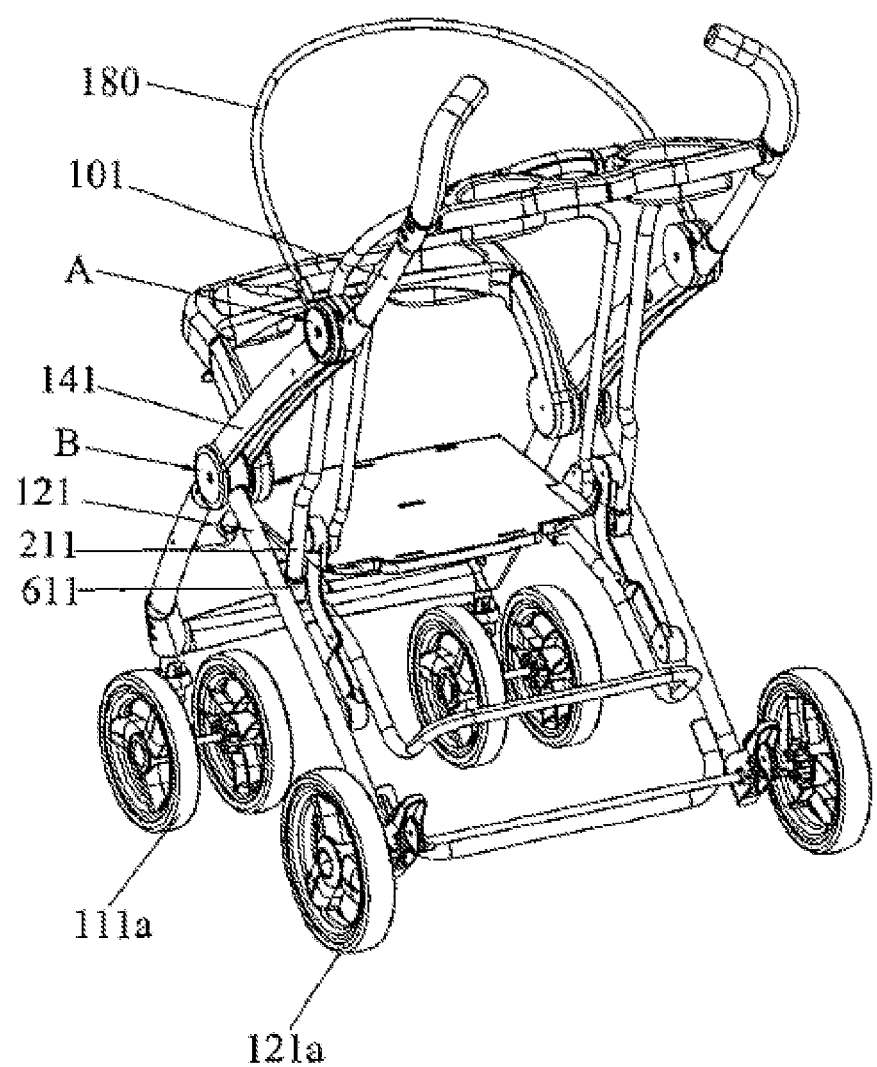
FIG. 2 is another perspective view of the collapsible stroller shown in FIG. 1.

Referring to FIGS. 1 and 2, a collapsible stroller 10 can comprise a support frame, a linkage assembly, and a wheel assembly. The support frame can include handle arms 101 and 102, front leg tubes 111 and 112, rear leg tubes 121 and 122, a seat board 131, and two linking segments 141 and 142 mounted at two sides of the seat board 131. The stroller 10 can also comprise a tray 153, a table 160, a footrest 170, a canopy wire frame 180, and a backrest tube 190. The footrest 170 can be assembled between the two front leg tubes 111 and 112. Two sides of the table 160 can respectively include coupling extensions 161 and 162 that can respectively connect with the linking segments 141 and 142. The wheel assembly can include front wheels 111a and 112a, and rear wheels 121a and 122a. The front wheels 111a and 112a are respectively mounted with the lower ends of the front leg tubes 111 and 112, whereas the rear wheels 121a and 122a are respectively assembled with the lower ends of the rear leg tubes 121 and 122. The collapsible stroller 10 has a symmetric construction. The detailed construction of the stroller 10 can be described hereafter with reference to the side of the stroller 10 where the linking segment 141 is assembled, the other side having a similar construction disposed symmetrically.

Referring again to FIGS. 1 and 2, all of the main parts of the support frame can be pivotally connected with one another. The handle arm 101 can have an upper end provided with a grasping handle 101a, and a lower end pivotally connected with a rear end of the linking segment 141 via a first hinge structure A. The front leg tube 111, the rear leg tube 121, and the coupling extension 161 are respectively connected with a front end of the linking segment 141 via a second hinge structure B.

Figure 3:
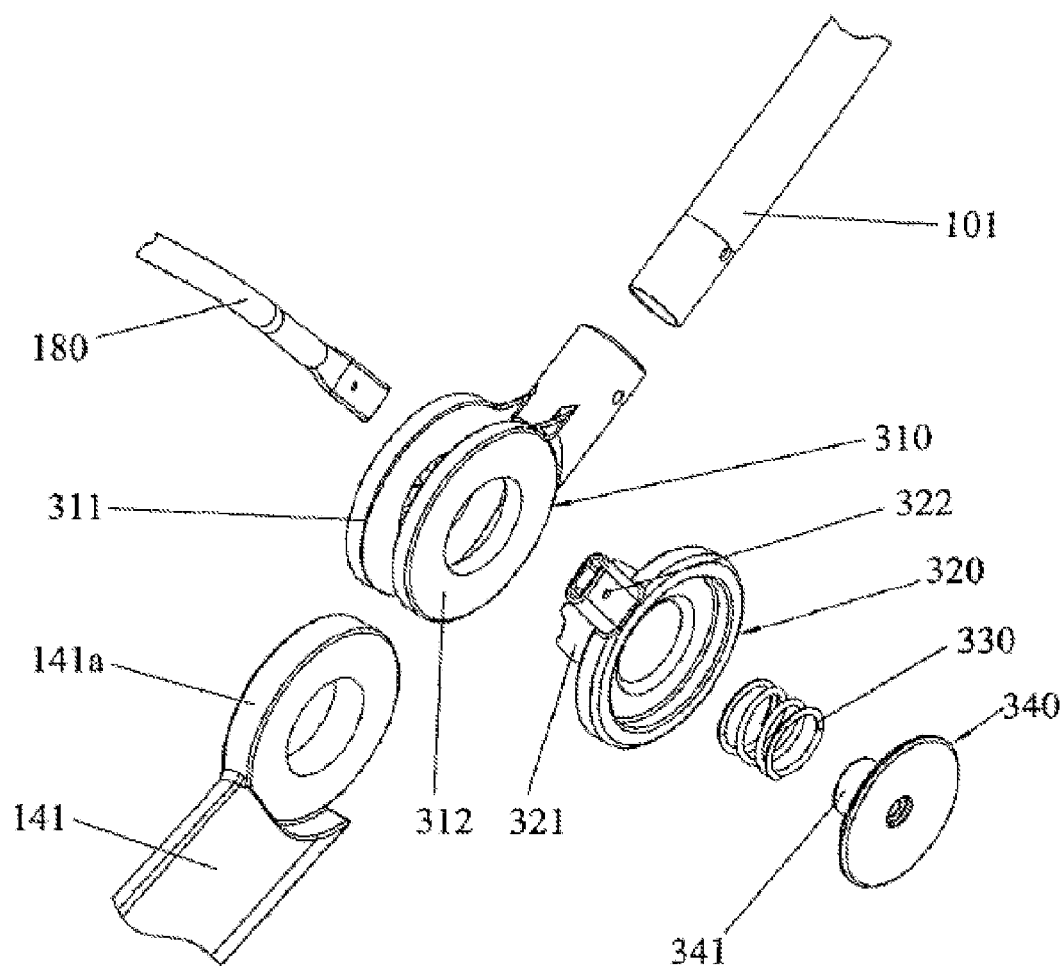
FIG. 3 is a schematic view illustrating a first hinge structure used in the stroller shown in FIG. 1.

As shown in FIG. 3, the first hinge structure A can comprise a first coupling element 310, a second coupling element 320, a spring 330, and an end cap 340. The first coupling element 310 can have an end affixed with the handle arm 101, and another end forming two annular collars 311 and 312 between which is defined a slot. The rear end of the linking segment 141 can form an annular collar 141a. The second coupling element 320 can have a side provided with a raised portion 321. The collar 141a of the linking segment 141 can be mounted through the slot between the collars 311 and 312 of the first coupling element 310, such that the central holes of the collars 312, 312, and 141a are aligned with one another. The raised portion 321 formed on the second coupling element 320 is passed through the central holes of the collars 312, 312, and 141a to pivotally connect the linking segment 141 with the first coupling element 310. A side of the end cap 340 can have a protruding shaft 341 around which the spring 330 can be mounted. As the end cap 340 is assembled with the second coupling element 320, the spring 330 can be received in the second coupling element 320. The second coupling element 320 can also include a socket 322 through which the canopy wire frame 180 is fixedly engaged. Accordingly, the canopy wire frame 180 can be adjustably rotated relative the linking segment 141.

Figure 4:
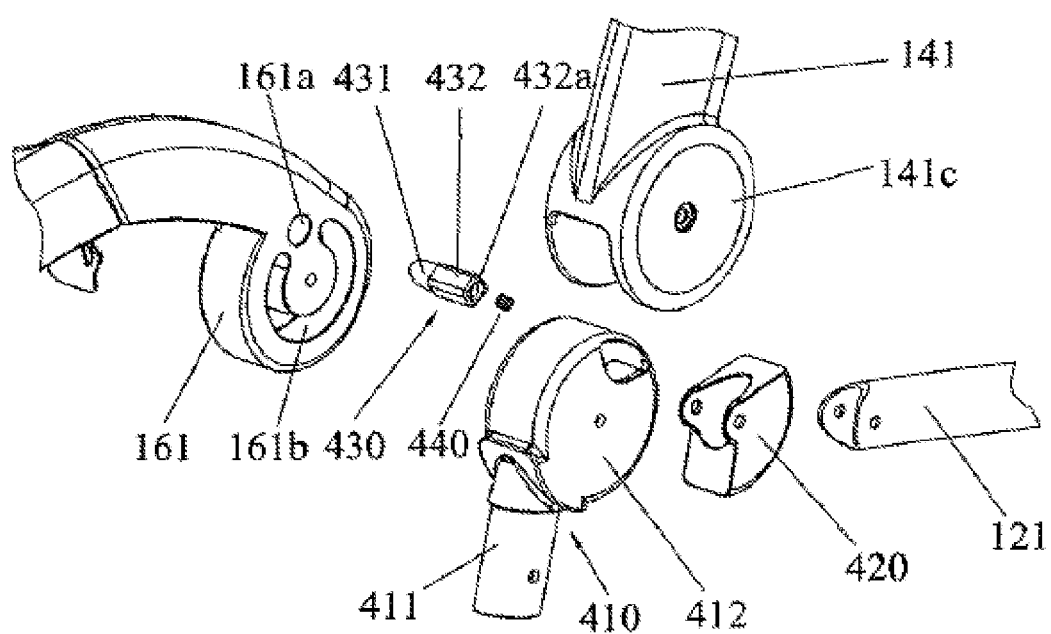
FIG. 4 is a schematic view illustrating a second hinge structure used in the stroller shown in FIG. 1.
Figure 5:
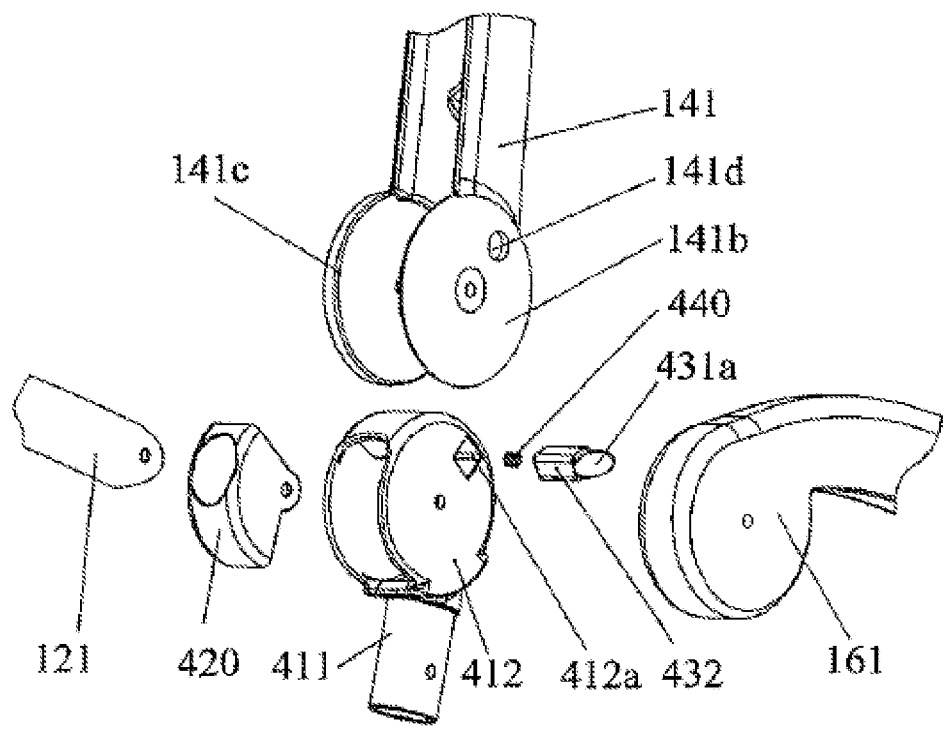
FIG. 5 is a schematic view illustrating the second hinge structure of FIG. 4 from an opposite side.

As shown in FIGS. 4 and 5, the second hinge structure B can include a front leg coupling element 410, a rear leg coupling element 420, a table latch 430, and a spring 440, all of which can be pivotally connected together. The table latch 430 and the spring 440 are restrainedly assembled between the coupling extension 161 and the front leg coupling element 410. More specifically, the front leg coupling element 410 and the rear leg coupling element 420 can be made of plastics materials. The front leg coupling element 410 can comprise a fixing end 411 and a pivot joining portion 412. The fixing end 411 can be secured with the front leg tube 111. The rear leg coupling element 420 can be installed over the rear leg tube 121, and both of which can be assembled in the pivot joining portion 412 of the front leg coupling element 410. The front end of the linking segment 141 can include two ear portions 141b and 141c. The table latch 430 can include a circular portion 431 and a rectangular portion 432. The circular portion 431 can have an angled surface 431a that is joined with the rectangular portion 432. The rectangular portion 432 can have a cavity 432a adapted to receive the spring 440. The coupling extension 161 can have a circular lock opening 161a and an arcuate guide slot 161b. The pivot joining portion 412 of the front leg coupling element 410 has a rectangular receiving opening 412a. The ear portion 141b of the linking segment 141 can have a circular hole 141d through which the circular portion 431 of the table latch 430 is passed to lie adjacently facing the lock opening 161a or the guide slot 161b of the coupling extension 161. The rectangular portion 432 can be mounted through the receiving opening 412a of the pivot joining portion 412. The spring 440 can have one end placed in the cavity 432a of the rectangular portion 432, and an opposite end in contact with an inner sidewall of the front leg coupling element 410. When the stroller apparatus 10 is in a use configuration, the circular portion 431 can be engaged through the lock opening 161a to lock the table 160 in place. As the stroller apparatus 10 is being folded, the linking segment 141 can move relative to the front leg coupling element 410. As a result, the interaction of the angled surface 431a can cause the circular portion 431 to disengage from the lock opening 161a and movably guided through the guide slot 161b. The table 160 can be thereby freely rotated downward.

Figure 6:
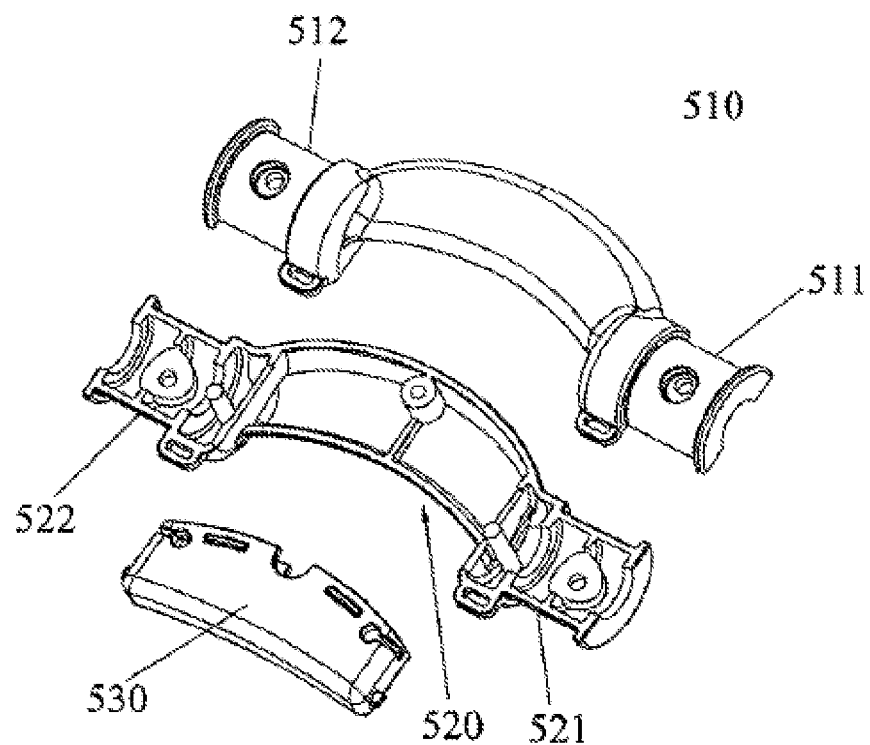
FIG. 6 is a schematic view illustrating a collapse actuator mechanism used in the stroller shown in FIG. 1.
Figure 7:
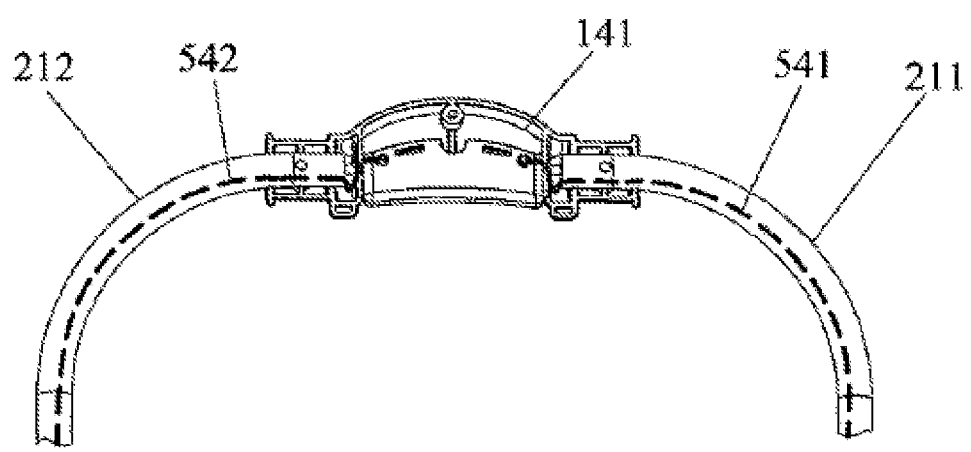
FIG. 7 is another schematic view illustrating the collapse actuator mechanism shown in FIG. 1.

As shown in FIGS. 6 and 7, the linkage assembly can comprise linkage tubes 211 and 212 that have upper ends connected with a collapse actuator mechanism 500. The collapse actuator mechanism 500 can include an upper casing 510, a lower casing 520 and a button 530. The lower casing 520 can include two side portions that are respectively affixed with the upper ends of the linkage tubes 211 and 212, and respectively have second recesses 521 and 522 having an arc-shape. The upper casing 510 can be fixedly assembled with the lower casing 520, and also have two ends secured with the upper ends of the linkage tubes 211 and 212. Likewise, the upper casing 510 can have two side portions respectively formed with first recesses 511 and 512 having an arc-shape. When the upper casing 510 is assembled with the lower casing 520, the first recess 511 and the second recess 521 can be placed facing each other to form a first rounded opening, whereas the first recess 512 can be placed facing the second recess 522 to form a second rounded opening. The assembly of the upper casing 510 and the lower casing 520 can form a hollow housing through which the button 530 can be movably mounted. The button 530 can have two sides respectively connected with cables 541 and 542 that are respectively disposed through the interior of the linkage tubes 211 and 212 and extend to lower ends thereof. Referring to FIGS. 1, 2, 8 and 9, the lower ends of the linkage tubes 211 and 212 can be respectively mounted with latch mechanisms. In particular, the latch mechanism associated with the linkage tube 212 can include a spring-biased lock (not shown), and a holder element 611 made of plastics material. The spring-biased lock can be connected with the lower end of the cable 541, whereas the holder element 611 can be affixed with the rear leg tube 121. When the button 530 is operated, the cable 541 can pull the corresponding spring-biased lock to disengage from the holder element 611, thereby unlocking the stroller 10.

Figure 8:
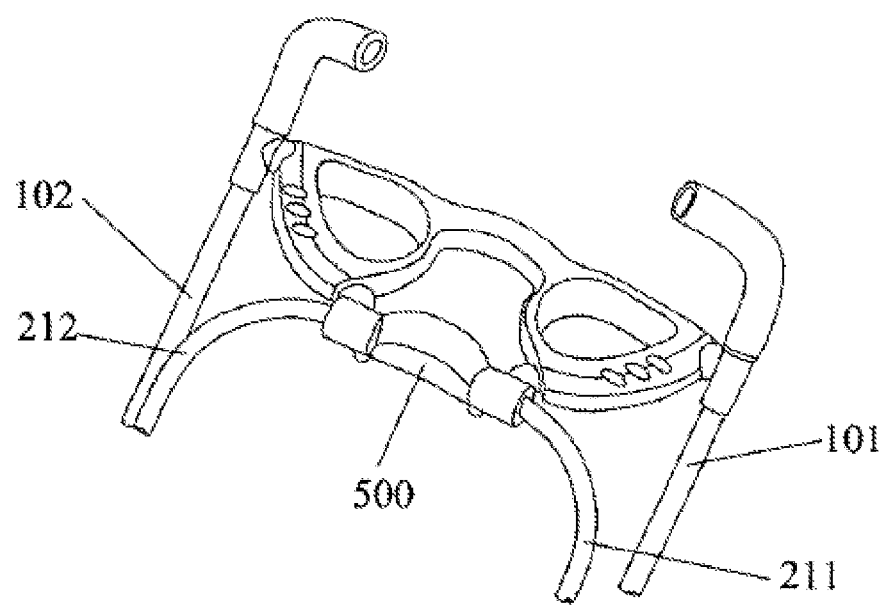
FIG. 8 is a schematic view illustrating the assembly of a tray in the stroller shown in FIG. 1.
Figure 9:
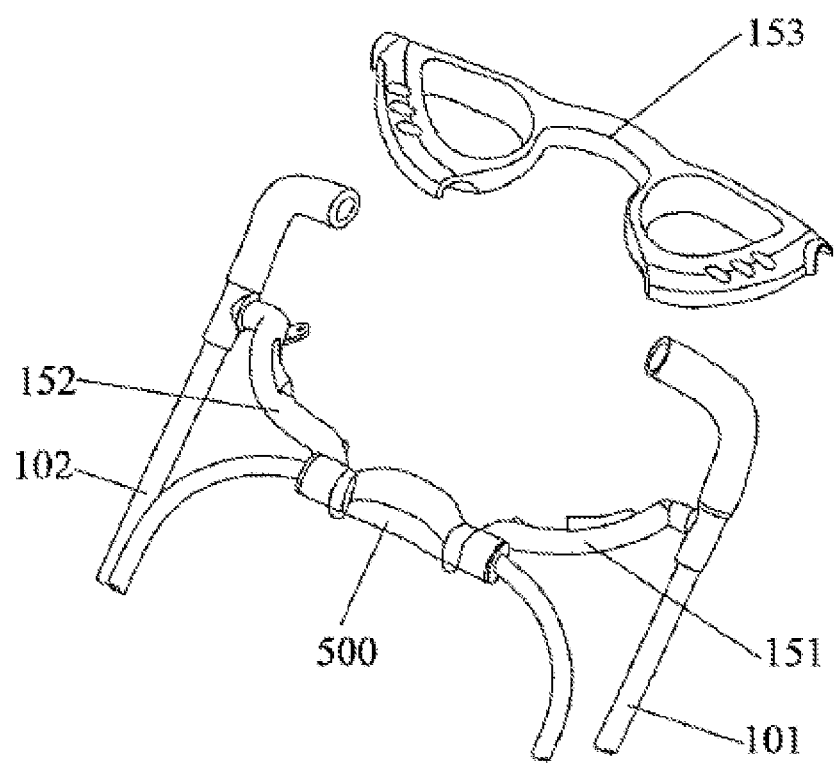
FIG. 9 is another schematic view illustrating the assembly of the tray shown in FIG. 8.
Figure 10:
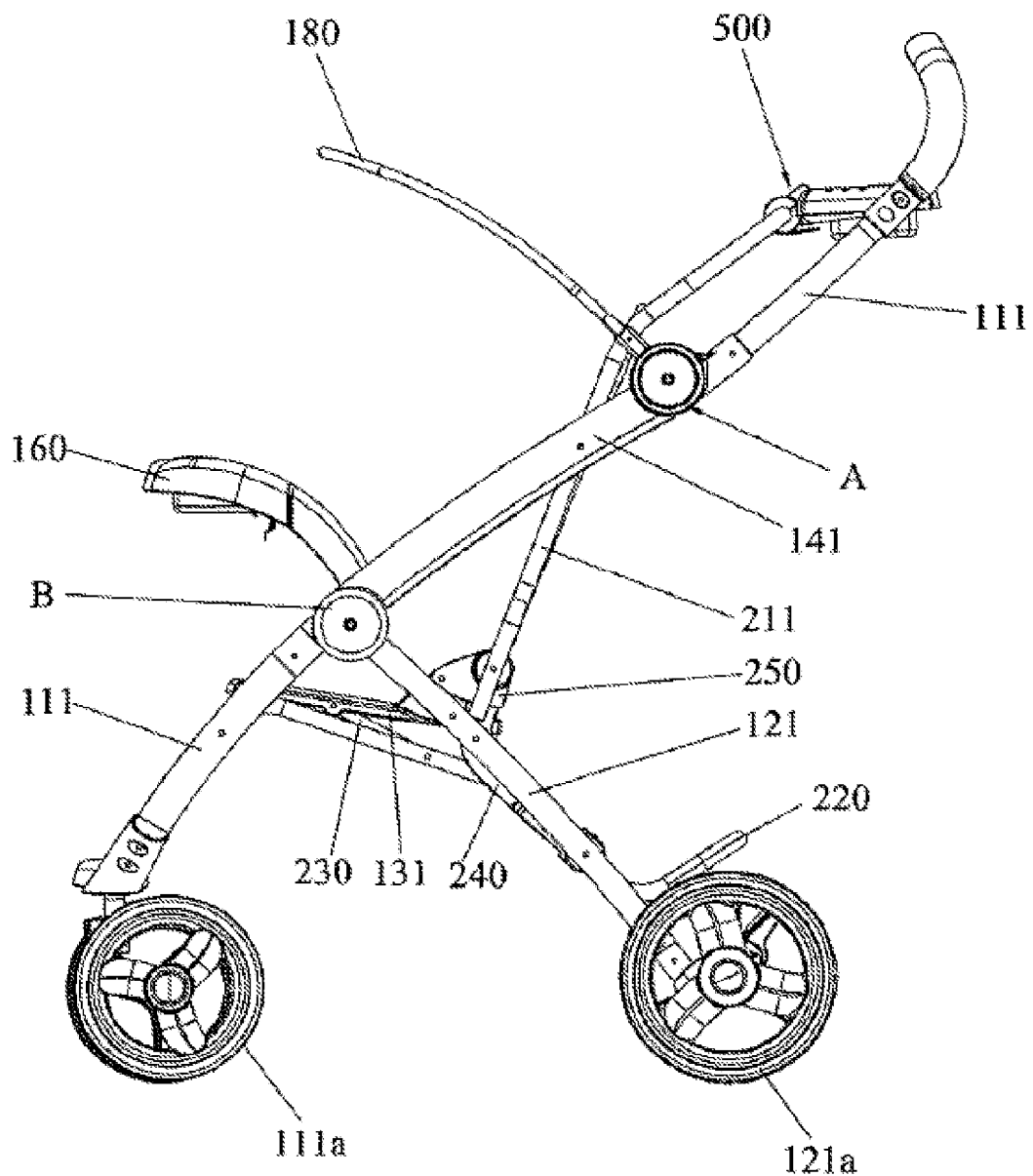
FIGS. 10 through 13 are schematic views illustrating intermediate stages of the stroller shown in FIG. 1 when it is being collapsed.
Figure 11:
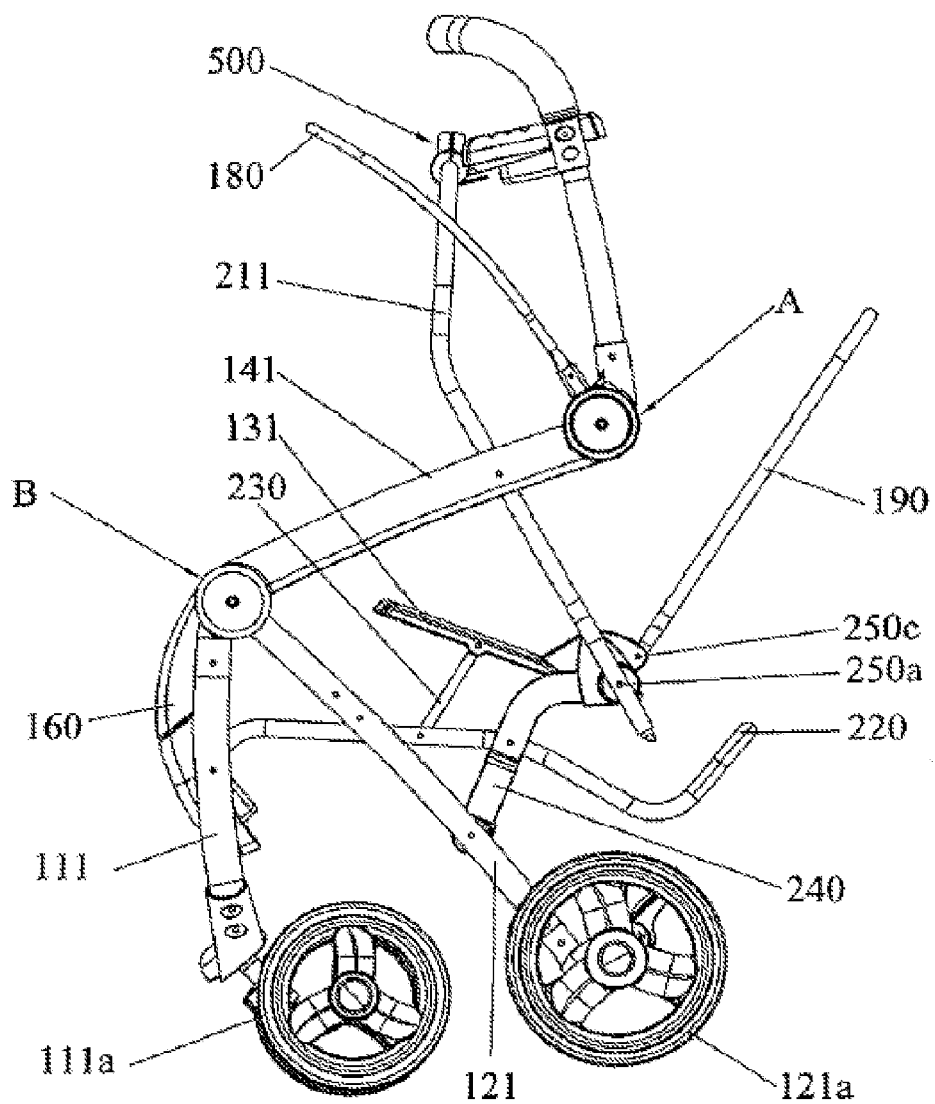
Figure 12:
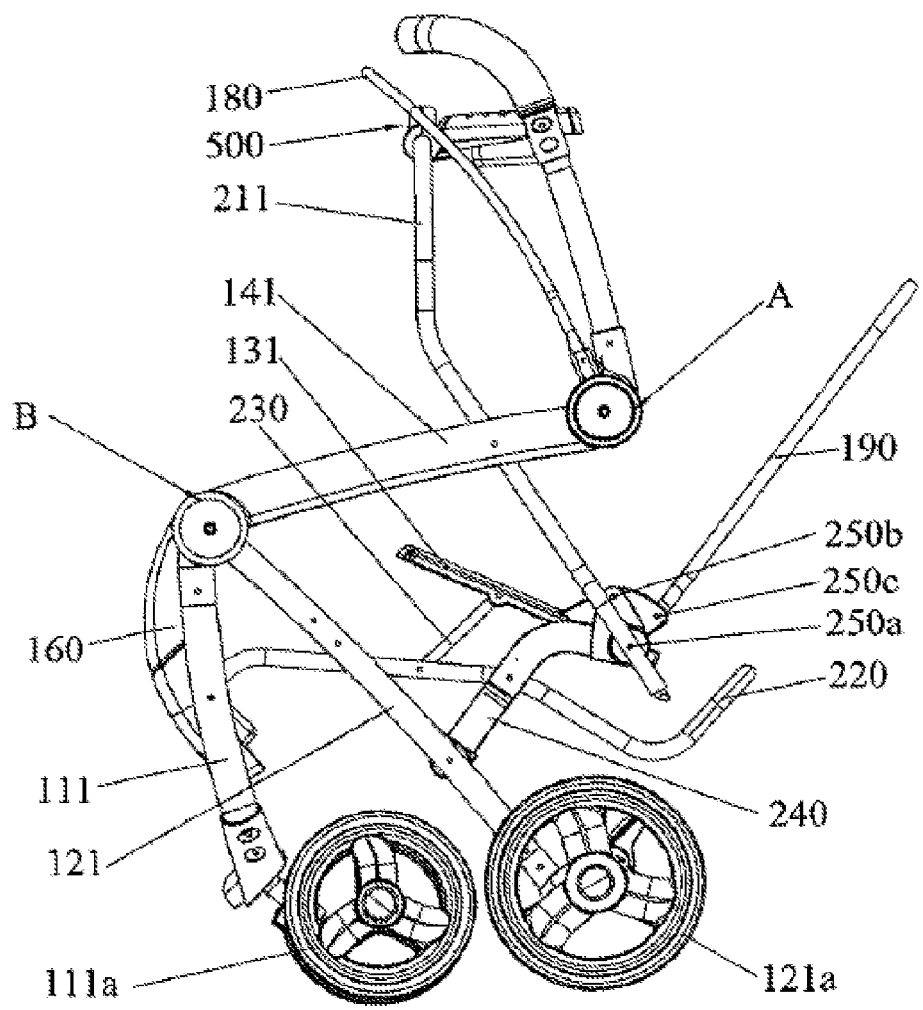

As shown in FIGS. 8 and 9, the linkage assembly can also comprise support brackets 151 and 152 with which is affixed the tray 153. More specifically, the support brackets 151 and 152 are respectively located above the linking segments 141 and 142, and are connected between the handle arms 101 and 102. The support bracket 151 can have one end pivotally connected with the first rounded opening of the collapse actuator mechanism 500, and another end pivotally connected with the handle arm 101. Likewise, the support bracket 152 can have one end pivotally connected with the second rounded opening of the collapse actuator mechanism 500, and another end pivotally connected with the handle arm 102. When the stroller 10 is being folded, the support brackets 151 and 152 can respectively rotate relative to the linkage tubes 211 and 212 and the handle arms 101 and 102 to suitably fold the tray 153.

Referring to FIGS. 1, 2, 10 and 12, the linkage assembly can further include a basket support frame 220, a first link element 230, a second link element 240, and a third link element 250. The first link element 230 and the second link element 240 can be formed as flat elongated rods, and the third link element 250 can be made of a plastics material. More specifically, a middle portion of the linkage tube 211 can be pivotally connected with a middle portion of the linking segment 141. A lower end of the linkage tube 211 and an upper end of the second link element 240 can be pivotally connected with a first pivot connection 250a provided on the third link element 250, so that they can rotate around the first pivot connection 250a. A lower end of the second link element 240 can be pivotally connected with a middle portion of the rear leg tube 121. A front of the basket support frame 220 can be pivotally connected with a middle portion of the front leg tube 111, while a middle portion of the basket support frame 220 can be pivotally connected with a middle portion of the second link element 240. The first link element 230 can have two opposite ends pivotally connected with the middle portion of the basket support frame 220 and a middle position on the side edge of the seat board 131, respectively. Preferably, the rear end of the seat board 131 is pivotally connected with a second pivot connection 250b provided on the third link element 250, whereby the rear end of the seat board 131 can rotate about the second pivot connection 250b. The backrest tube 190 can be pivotally connected with a third pivot connection 250c provided on the third link element 250. All the parts of the linkage assembly described above are pivotally connected with one another, and are also connected with associated parts of the stroller frame via pivot connections. When the stroller 10 is to be collapsed, only the handle arms 101 and 102 are operated with a one-step actuation to fold the stroller quickly. In particular, the linkage tube 211, the second link element 240, the seat board 131, and the backrest tube 190 are all pivotally connected with the third link element 250 at spaced-apart pivot connections. As a result, when the stroller 10 is being folded, the linkage tube 211, the second link element 240, the seat board 131, and the backrest tube 190 can rotate relative to one another to collapse the stroller into a compact volume. Moreover, as shown in FIGS. 1 and 2, the basket support frame 220 can be formed as a U-shaped tubular structure that has side distal ends that respectively bend upward near the rear wheels 121a and 122a to form a support plane. After it is fully collapsed, the stroller 10 can be placed in a standing position on a ground supported by the basket support frame 220 and the rear wheels 121a and 122a, which can facilitate its storage and portability.

Exemplary operation to collapse the stroller 10 is described hereafter with reference to FIGS. 10 through 13.

Figure 13:
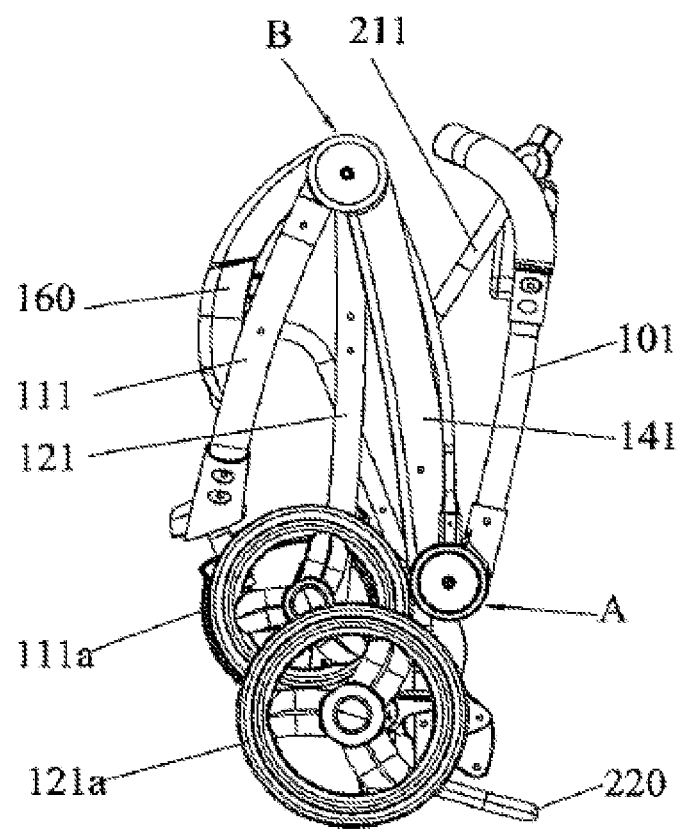

When the stroller 10 is to be collapsed, the collapse actuator mechanism 500 on the linkage tube 211 can be operated, for example by pressing the button 530. As a result, the button 530 can pull the cables 541 and 542 in movement to disengage the associated spring-biased locks of the latch mechanisms from the corresponding holder elements 611, which can thereby unlock the stroller. Then, the handle arm 101 can be rotated about the first hinge structure A relative to the linking segment 141 in a direction that folds the handle arm 101 over the linking segment 141. The rotation of the handle arm 101 can drive the linkage tube 211 in rotation about a pivot point at the middle portion of the linking segment 141 so that the linkage tube 211 can also collapse toward the linking segment 141. In the meantime, the rotation of the linkage tube 211 can also drive other parts of the linkage assembly to rotate about their respective pivot joints, which in turn can cause the front leg tube 111 and the rear leg tube 121 to rotate about the second hinge structure B to collapse toward the linking segment 141. At the same time, the front wheel 111a coupled with the front leg tube 111 and the rear wheel 121a coupled with the rear leg tube 121 can also be arranged close to each other once the front leg tube 111 and the rear leg tube 121 are folded. As shown in FIG. 13, when the stroller 10 is fully collapsed, the front leg tube 111, the rear leg tube 121, the linking segment 141, the handle arm 101, and the moving parts of the linkage assembly are disposed generally parallel and overlap with one another. Moreover, the front wheel 111a and the rear wheel 121a are located close to each other. Furthermore, other pivotal elements of the stroller 10 can also be rotated in unison about their respective pivot joints to adequately collapse the stroller 10 into a reduced and compact volume.

When the stroller 10 is to be used, the handle arm 101 can be pulled outward, and then be grasped to deploy the stroller 10. All elements of the support frame and the linkage assembly can rotate about their respective pivot joints to respectively unfold by gravity action. Then, the handle arm 101 can be slightly pressed backward and downward to turn the latch mechanisms to a locked state. Then, the table 160 can be pushed upward to its deployed position, which can turn the stroller 10 to the fully deployed configuration shown in FIG. 1.

The stroller frame described herein includes at least two transverse pivotal axes defined by the first and second hinge structures A and B. When the stroller is folded, the elements of the stroller frame can be driven in rotation by the handle arms to respectively collapse toward the linking segments until they lie generally parallel to one another. The collapsed stroller can be disposed in a three-fold structure that has a smaller volume and is convenient to carry and store. Moreover, the stroller also comprises a linkage assembly including support brackets and linkage tubes. The linkage assembly can be pivotally connected between the linking segments and handle arms to increase stability of the stroller frame, and allows the handle arms to more smoothly drive the other frame elements to fold the stroller.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A collapsible stroller comprising:
a support frame including handle arms, front leg tubes, rear leg tubes, a seat board, and linking segments disposed at two sides of the seat board, wherein each of the linking segments has a first and a second end, the handle arms are respectively connected with the first ends of the linking segments via first hinge structures, the front leg tubes and the rear leg tubes are respectively connected with the second ends of the linking segments via second hinge structures, and the front and rear leg tubes have lower portions respectively mounted with front and rear wheels; and
a linkage assembly including support brackets and linkage tubes, wherein the support brackets are disposed above the linking segments and are connected with the handle arms, each of the linkage tubes has a first tube end pivotally connected with one associated support bracket, and a second tube end operable to detachably lock with one associated rear leg tube, and the linkage tubes are respectively connected with the linking segments via pivot connections located between the first and second tube ends;
wherein the second tube ends of the linkage tubes are respectively displaced away from the rear leg tubes and the second hinge structures when the stroller is in a collapsed state, and the second tube ends of the linkage tubes are respectively locked adjacently with the rear leg tubes when the stroller is in an unfolded state.

2. The stroller according to claim 1, wherein the linkage assembly further includes a basket support frame, first link elements, second link elements, and third link elements, each of the linkage tubes having a lower portion pivotally connected with an upper end of one associated second link element via a first pivot connection, each of the second link elements has a lower end pivotally connected with one associated rear leg tube, a front portion of the basket support frame is pivotally connected with the front leg tubes, an intermediate portion of the basket support frame is pivotally connected with intermediate portions of the second link elements between the upper and lower ends of the second link elements, and each of the first link elements has two opposite ends respectively connected pivotally with the intermediate portion of the basket support frame and a side edge of the seat board.

3. The stroller according to claim 2, wherein a rear of the seat board is pivotally connected with second pivot connections provided on the third link elements.

4. The stroller according to claim 2, wherein the support frame further comprises a backrest tube pivotally connected with third pivot connections provided on the third link elements.

5. The stroller according to claim 1, wherein at least one of the first hinge structures includes a first coupling element, a second coupling element, a spring and an end cap, the first coupling element has a first end affixed with one associated handle arm, and a second end pivotally connected with one associated linking segment via the second coupling element, the spring being installed on the second coupling element covered by the end cap.

6. The stroller according to claim 5, wherein the support frame further comprises a canopy wire frame, and the second coupling element has a socket adapted to engage with the canopy wire frame.

7. The stroller according to claim 1, wherein the support frame further comprises a table having two sides respectively provided with coupling extensions that pivotally connect with the linking segments.

8. The stroller according to claim 7, wherein at least one of the second hinge structures includes a front leg coupling element and a rear leg coupling element, the front leg coupling element is affixed with one associated front leg tube, the rear leg coupling element is secured with one associated rear leg tube, and the front leg coupling element, the rear leg coupling element, and one linking segment and one coupling extension associated therewith are pivotally connected together.

9. The stroller according to claim 8, wherein the second hinge structure further comprises a table latch and a spring, the associated coupling extension has a lock opening and a guide slot, the table latch and the spring are assembled between the coupling extension and the front leg coupling element, the spring biasing the table latch to engage with the lock opening or to be guided through the guide slot, wherein the table is locked in position when the table latch engages with the lock opening, and the table is allowed to rotate relative to the linking segments when the table latch is movably guided through the guide slot.

10. The stroller according to claim 2, wherein the basket support frame includes a rear portion that bends upward near the rear wheels to form a support plane, whereby the stroller once collapsed is adapted to stand up supported by the rear portion of the basket support frame and the rear wheels.

11. The stroller according to claim 1, wherein the support frame further comprises a tray affixed with the support brackets.

12. A collapsible stroller comprising:
a support frame including handle arms, front leg tubes, rear leg tubes, a seat board, and linking segments disposed at two sides of the seat board, wherein each of the linking segments has a first and a second end, the handle arms are respectively connected with the first ends of the linking segments via first hinge structures, the front leg tubes and the rear leg tubes are respectively connected with the second ends of the linking segments via second hinge structures, and the front and rear leg tubes have lower portions respectively mounted with front and rear wheels;
a linkage assembly including support brackets and linkage tubes, wherein the support brackets are disposed above the linking segments and are connected with the handle arms, each of the linkage tubes has a first tube end pivotally connected with one associated support bracket, and a second tube end operable to detachably lock with one associated rear leg tube, the linkage tubes being connected with the linking segments via pivot connections located between the first and second tube ends; and
a collapse actuator mechanism and latch mechanisms, wherein the latch mechanisms are respectively mounted adjacent to the second tube ends of the linkage tubes, each of the latch mechanisms includes a spring-biased lock and a holder element, the collapse actuator mechanism includes a button that is arranged near the first tube ends of the linkage tubes and is connected with two cables respectively disposed through the interior of the linkage tubes and extending to the second tube ends of the linkage tubes to connect with the spring-biased locks, and the holder elements are respectively affixed with the rear leg tubes, whereby the button is operable to drive the spring-biased locks to disengage from the holder elements.

13. The stroller according to claim 12, wherein the linkage assembly further includes:
a frame portion having side segments pivotally connected with the front leg tubes;
a plurality of first link elements, each of the first link elements having two opposite ends respectively connected pivotally with one associated side segment of the frame portion and one associated side edge of the seat board; and
a plurality of second link elements, wherein each of the second link elements has an upper end pivotally connected with one associated linkage tube near the second tube end thereof, a lower end pivotally connected with one associated rear leg tube, and an intermediate portion between the upper and lower ends that is pivotally connected with one associated side segment of the frame portion.

14. The stroller according to claim 13, wherein the support frame further includes a backrest tube, and the linkage assembly further includes a plurality of third link elements, the third link elements being respectively connected with a rear portion of the seat board and the backrest tube.

15. The stroller according to claim 13, wherein the frame portion is a basket support frame.

16. A collapsible stroller comprising:
a front leg tube and a rear leg tube;
a seat board;
a handle arm;
a linking segment disposed at one side of the seat board, wherein the linking segment includes a first and a second end, the first end of the linking segment being connected with the handle arm via a first hinge structure, the second end of the linking segment being respectively connected with the front and rear leg tubes via a second hinge structure; and
a support bracket pivotally connected with the handle arm;
a linkage tube having a first and a second tube end, wherein the first tube end is pivotally connected with the support bracket, and the second tube end is operable to detach and attach with the rear leg tube, and the linkage tube is assembled with the linking segment via a pivot connection located between the first and second tube ends;
a frame portion having a side segment pivotally connected with the front leg tube;
a first link element having two opposite ends respectively connected pivotally with the side segment of the frame portion and a side edge of the seat board; and
a second link element having an upper end, a lower end, and an intermediate portion between the upper and lower ends, wherein the upper end is pivotally connected with the linkage tube, the lower end is pivotally connected with the rear leg tube, and the intermediate portion is pivotally connected with the side segment.

17. The stroller according to claim 16, wherein the frame portion is a basket support frame.

18. The stroller according to claim 16, further including a backrest tube, and a third link element respectively connected pivotally with a rear portion of the seat board and backrest tube.

19. The stroller according to claim 16, further including a table having one side provided with a coupling extension that pivotally connect with the linking segment.

20. The stroller according to claim 19 wherein the coupling extension has a lock opening and a guide slot, and the second hinge structure includes:
- a front and a rear leg coupling element, wherein the front leg coupling element is affixed with the front leg tube, the rear leg coupling element is secured with the rear leg tube, and the front leg coupling element, the rear leg coupling element, the linking segment and the coupling extension are pivotally connected together; and
- a table latch and a spring assembled between the coupling extension and the front leg coupling element, wherein the spring is operable to bias the table latch to engage with the lock opening or to be guided through the guide slot, the table being locked in position when the table latch engages with the lock opening, and the table being allowed to rotate relative to the linking segment when the table latch is movably guided through the guide slot.

* * * * *